H. Knowles,
Reciprocating Saw Mill.
Nº 9,284. Patented Sep. 28, 1852.
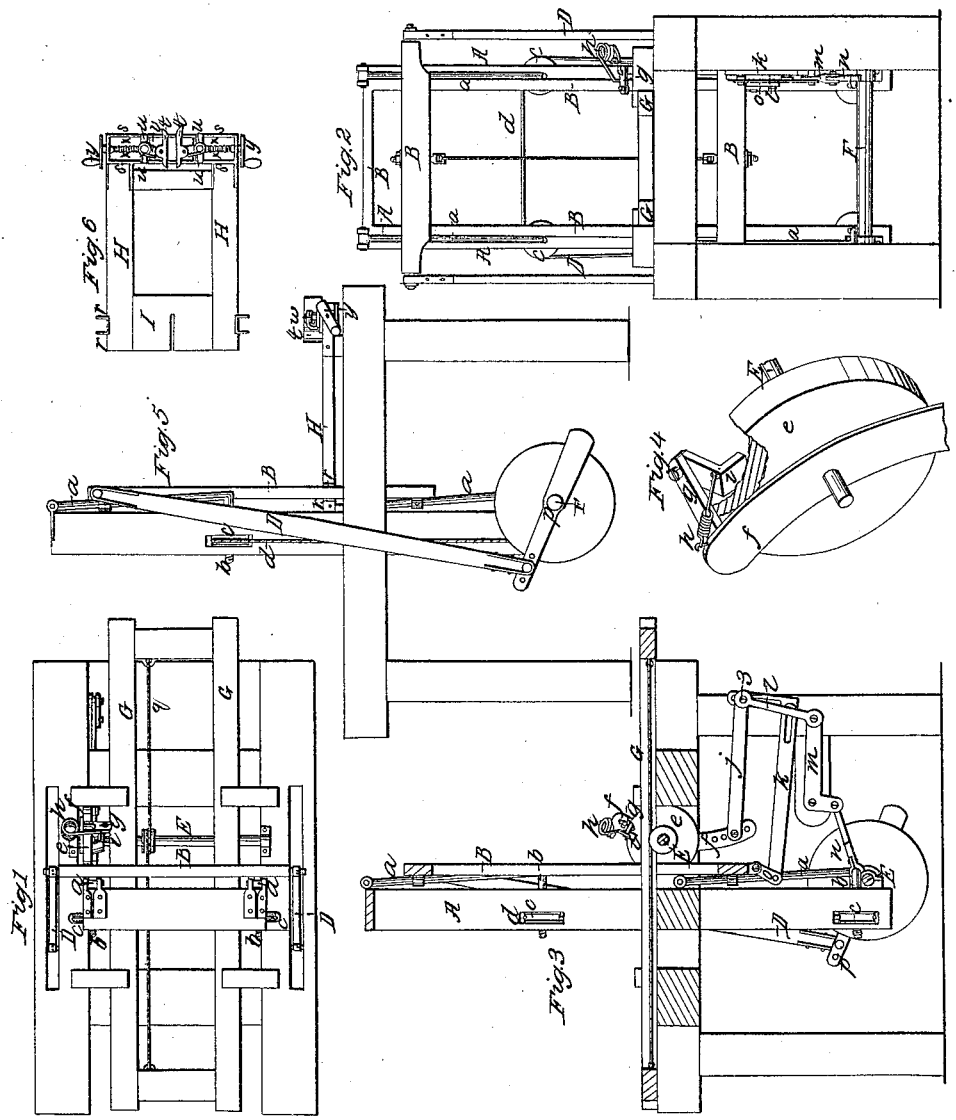

UNITED STATES PATENT OFFICE.

HAZARD KNOWLES, OF NEW YORK, N. Y.

SAWMILL.

Specification forming part of Letters Patent No. 9,284, dated September 28, 1852; Reissued November 30, 1858, No. 629.

*To all whom it may concern:*

Be it known that I, HAZARD KNOWLES, of the city, county, and State of New York, have invented sundry new and useful Improvements in Sawmills; and I do hereby declare that the following is a full and exact description thereof, reference being had to the accompanying drawings, making a part of this specification, Figure 1 being a top view; Fig. 2, an end view; Fig. 3, a longitudinal vertical section, and Fig. 4 a detached portion of my improved saw mill, arranged for sawing logs, and Fig. 5 is a side view, and Fig. 6 a detached portion of my improved saw mill, as arranged for re-sawing boards, &c.

Similar letters indicate like parts in all the figures.

The nature of my invention consists, in the first place, in the employment of inclined ways for the saw gate, for the purpose of causing the saw gate to strike forward as it descends, and to retreat backward as it rises; by which arrangement the saw is enabled to be placed in a straight position within its gate, and to be more uniformly strained and with a greater degree of tension than usual, which causes its teeth to act with more energy and uniformity than the teeth of saws when arranged in inclined positions within their supporting frames or gates in the usual manner.

The second feature of my invention, consists in making the saw gate ways adjustable, by which I am enabled to vary the action of the saw placed in the said gate to suit the nature and the depth of the material operated upon.

The third feature of my invention, consists in the combination with each other of all the ways of the saw gate, in such a manner that they can be simultaneously and uniformly varied and adjusted in their positions while the saw gate is in motion.

The fourth feature of my invention consists in the arrangement of the feeding apparatus, in connection with the saw gate and the adjustable ways, in such a manner that the feed motion communicated thereby to the material operated upon, will invariably be in perfect harmony with the cut of the saw: and consequently, this said arrangement, in connection with the third feature of my invention, enables me to instantaneously vary the amount of the action of the saw for the purpose of enabling me to ease it when passing through knots, or to adapt it to the nature and the depth of the material operated upon.

The ways $a$, $a$, of the saw gate B, are hinged to the fender posts A, A, and they are all connected to each other by means of the screws $b$, $b$,—which may be either connected to the said ways, or form portions of the same—and which pass through female screws in the centers of the pulleys $c$, $c$; which pulleys work in slots in the fender posts, or in other suitable guides, and are all connected to each other by the endless band or chain $d$. It will therefore be perceived, that by taking hold of the said endless band or chain, and imparting motion to the series of pulleys $c$, $c$, the ways $a$, $a$, of the saw gate can be varied in their inclination to any desired extent, for regulating the action of the saw, and adapting it to the nature of the material operated upon.

I have represented in the drawings an endless band as connecting the four pulleys $c$;—but in practice, I intend to make use of a chain for that purpose, adapted to projections or depressions on the peripheries of the said pulleys, for the purpose of insuring perfect uniformity in their movements.

Feeding motion is imparted to the carriage G, from the saw gate, in the following manner; viz;—a transverse shaft E, rests in suitable bearings under the carriage and within a short distance of the fender posts; which shaft is connected to the carriage by means of a rope $q$, having a turn around a pulley on the said shaft and with its ends secured to the ends of the carriage; or by means of a pinion or pinions on the said shaft, gearing into a rack or racks on the carriage, in the usual manner. A feeding wheel $e$, is secured to the shaft E, in the position shown in the drawings: by the side of the said wheel $e$, a lever $f$, is also placed upon the shaft E, and works freely thereupon; an arm $g$, projects from the upper end of the lever $f$, over the top of the wheel $e$; a gripper $i$, is jointed to the under side of the arm $g$, and is drawn against the side of the wheel $e$—opposite to the lever $f$—by the spring $h$, as shown in the drawings. When the lever $f$, is vibrated upon the shaft E, the gripper $i$, will glide freely in one direction over the surface of the wheel $e$, and when moved in an opposite direction, the gripper will press so firmly against the side of the said wheel as to impart its own motion thereto. In place of the gripper $i$, a spring pawl may be combined with the arm $g$, in such a manner as to act in conjunction with ratchet teeth secured to the side, or to the periphery of the wheel $e$. The advantage of the curvilinear movement of the feeding gripper, or hand, over the ordinary tangential movement of the feeding hand, consists in its being adapted to impart a greater degree of motion to the feeding wheel, and also in being more certain and positive in its action.

Motion is imparted to the lever $f$, from the saw gate, through the medium of the bar $j$, the angular lever $k$, and the short bar $o$, as shown in Fig. 3. The aforesaid bar $j$, and lever $k$, is connected to one of the saw gate ways $a$, by means of the bar $l$, the lever $m$, and the bar $n$, in the manner shown in Fig. 3;—by which arrangement the amount of motion imparted by the saw gate to the carriage G, will be governed by, and exactly correspond with the amount of horizontal forward movement imparted by the ways $a$, $a$, to the saw gate as it descends: To wit,—the bent and slotted lever $k$, the bar $j$, and the bar $l$, are connected to each other and to the lever $k$, by means of a joint pin $z$, which plays freely in a slot in the upright portion of the said lever $k$;—the lower end of the said bar $l$, being jointed to the end of the long arm of the lever $m$, and the short arm of the said lever being jointed to the lower end of one of the ways $a$, of the saw gate, by means of the bar $n$, it will be perceived that when the inclination of the series of ways ($a$, $a$,) of the saw gate is varied, the position of the pivot $z$, will be moved in the slot in the short arm of the lever $k$, which will vary the amount of motion imparted thereby, through the bar $j$, the lever $f$, and the wheel $e$, to the carriage, and cause it to exactly correspond with the degree of inclination given to the ways of the saw gate, and the amount of forward horizontal motion imparted by them to the saw gate during its descent.

For slitting or re-sawing plank, boards &c., a mill may be constructed in the following exceedingly simple manner; viz;—combine with the fender posts of a suitable frame, the adjustable ways $a$, $a$, and the saw gate B, substantially as represented in the drawings and herein before set forth. Then place upon suitable bearings a carriage H, (Fig. 6) and connect it to the sides of the saw gate by means of the embracing ledges $r$, $r$, secured to the sides of the said carriage. The saw plays in a slit in the forward end I of the carriage H; and a fence may be secured to the said forward end of the carriage, and a pressing roller combined with it, in any well known and usual manner, for the purpose of holding the board or plank when it is operated upon by the saw. At the rear end of the said carriage H, are arranged spring clamps $t$, $t$, &c., in such a manner that when the carriage is moved rearward, during the down stroke of the saw, the said clamps will glide freely over the sides of the board, and when the carriage is moved forward, by the upward stroke of the saw, the said clamps will grip the board and carry it forward to be again acted upon by the saw. The jaws $t$, $t$, of the said spring clamp, are arranged and operated in the following manner; viz;—the jaws are connected to boxes $u$, $u$, by means of the forwardly inclining short arms $v$, $v$; the boxes $u$, $u$, are secured between the ways $s$, $s$, and slide freely therein; set screws $x$, $x$, pass through the openings in the connecting ends of the ways $s$, $s$, and pass into female screws in the boxes $u$, $u$; springs $w$, $w$, are connected to the tops of the boxes $u$, $u$, and press rearward against the front sides of the bars $v$, $v$, for the purpose of causing the jaws $t$, $t$, to bear lightly against the board or plank, and prevent the said jaws from gliding over the same when they are moved forward. It will therefore be perceived, that when the carriage is moved rearward, the arms $v$, $v$, having nearly free forward play, allow the jaws $t$, $t$, to glide over the board or plank placed between the same; and when the said carriage is moved forward, the light pressure of the jaws $t$, $t$, upon the board, will cause them to incline the bars $v$, $v$, to the rear, and thereby force the jaws inward, and make them firmly grip and carry forward whatever may be embraced between them. The set screws $x$, $x$, and the cranks $y$, $y$, upon the same, serve to vary the positions of the feeding clamps, and to adapt them to the different thicknesses of the stuff to be operated upon.

My improved manner of arranging and operating reciprocating saws, has the following advantages, viz: First, the saw being placed in a straight position within its gate, can be much more uniformly and tightly strained, and with less liability to warp and injure the saw gate, than would be possible were it placed in an oblique position; and consequently its teeth have a firmer and more uniform action upon the wood than the teeth of the inclined or overhanging saw—as usually arranged—and therefore, is less liable to injury and can be placed in a lighter gate. Second. By means of my arrangement, every saw tooth, within range of the length of stroke of the saw, is unerringly compelled to perform its own share of the work; whereas, it is frequently the case that only a small proportion of the regular cutting teeth of the inclined saw perform any service; for the obvious reason that the degree of inclination of the said saw, the length of its stroke, the amount of the feed, and the depth of the material operated upon, must be all in perfect harmony with each other, to enable the cutting teeth of the saw to be all brought into action, and this is very rarely the case. But by my arrangement and operation of the saw and the feeding apparatus, the cut of the saw is always in perfect harmony with the feed, and every tooth within range of the stroke of the saw, is compelled to do its duty.

Having thus fully described my improvements in saw mills, what I claim therein as new and desire to secure by Letters Patent, is—

1. The adjustable ways of the saw gate when they are connected with each other in such a manner that they can be simultaneously and uniformly varied and adjusted in their positions, while the saw gate is in motion, for the purpose of varying the amount of the cutting action of the saw, substantially as herein set forth.

2. I also claim the connecting and arranging of the feeding apparatus with the saw gate and the adjustable ways thereof, in such a manner that the feeding motion communicated to the material operated upon, will invariably be in perfect harmony with the cut of the saw, and also in such a manner as will enable me to ease the action of the saw when passing through knots, and at any time adapt it to the nature and the depth of the material operated upon, substantially as herein set forth.

HAZARD KNOWLES.

Witnesses:
Z. C. ROBBINS,
M. W. BROWN.

[FIRST PRINTED 1912.]